Shaw's Improved Governor

No 121,968.   Patented Dec. 19 1871.

Witnesses  Inventor
Henry F. Shaw

UNITED STATES PATENT OFFICE.

HENRY F. SHAW, OF WEST ROXBURY, MASSACHUSETTS.

IMPROVEMENT IN GOVERNORS.

Specification forming part of Letters Patent No. 121,968, dated December 19, 1871; antedated December 2, 1871.

*To all whom it may concern:*

Be it known that I, HENRY F. SHAW, of West Roxbury, county of Norfolk and State of Massachusetts, have invented certain new and useful Improvements in Governor, of which the following is a specification:

The nature of my invention consists in constructing a pulley in such a manner that it is free to expand by the centrifugal force generated by its own revolutions, this action being checked by the belt which drives it, the pulley being hung on swinging housings and held by a weight, which acts against the tension of the belt, so that as the pulley enlarges its center is necessarily carried toward the pulley which drives it, this motion toward the driving-pulley being in proportion to the velocity of revolution, since its diameter increases with its velocity. The swinging housings are connected with the regulating-valve of the engine, so that any motion of the housings will cause a corresponding motion of the valve, and thus regulate or govern the engine.

Figure 1:
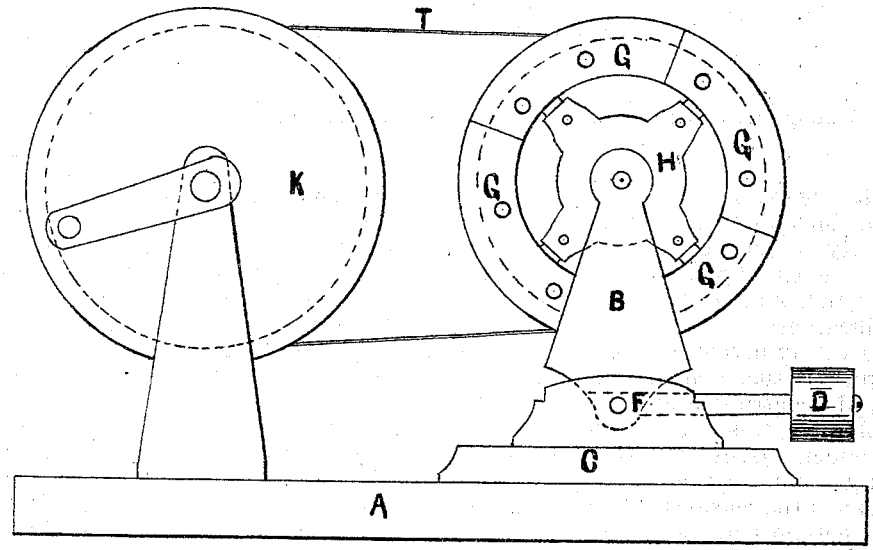
Figure 2:
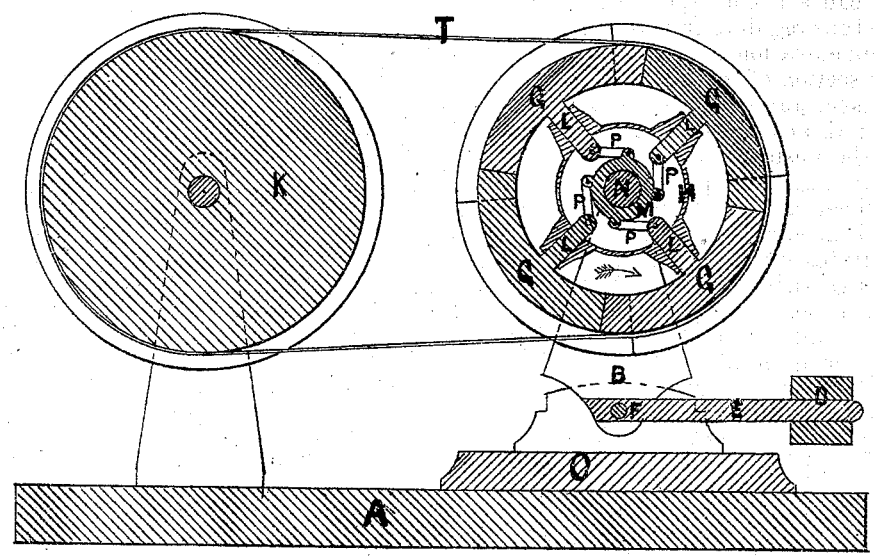

Figure 1 is an elevation of my invention. Fig. 2 is a vertical section of the same.

Let A represent any suitable base or support, and the wheel K any part of the engine from which it may be desirable to communicate motion to the governing device. T is a belt connecting the wheel K with the governing device G G G G, and, in combination with the center piece H, constitutes an expanding pulley, of which the exact construction is represented more fully in Fig. 2. Each segment G is connected, by a radial piece, L, and a link, P, with a collar, M, fitting loosely on a shaft, N, so that all of the segments G must move to or from the center simultaneously. This governing pulley is hung on a swinging housing, B, pivoted at F. D represents a weight, which, acting through the lever E, has a tendency to swing the housing B in the direction indicated by the arrow, and to carry the governing pulley away from the center of the wheel K, thus keeping the belt T always taut.

The operation of my device is as follows: As the segments G are free to move away from the center, being held in position only by the action of the weight D reacting against the belt T, it is evident that if the governing pulley is made to revolve rapidly the centrifugal force will enlarge the diameter of the pulley and take up more of the belt T, and thus lift the weight D, and through it operate on any suitable valve device for regulating the supply of steam. If desirable, this pulley may be hung on sliding housings, or the expanding-pulley may take the place of the pulley K, and an ordinary pulley be attached to the movable housing B and lever E.

This style of governor may be used for regulating any motor.

A peculiar feature of my governor is, that as the velocity increases the diameter of the pulley increases, thus causing it to revolve proportionally slower; that is, the relative velocity between the engine and the pulley varies with the velocity of the engine. An increase of the velocity of the engine does not cause a corresponding increase of the velocity of the pulley.

I claim as my invention—

The automatic expanding-pulley G G G G H in combination with the belt T, operating substantially as described, and for the purpose set forth.

HENRY F. SHAW.

Witnesses:
WILLIAM EDSON,
J. L. NEWTON.

(69)